United States Patent
Nie et al.

(10) Patent No.: US 11,701,727 B2
(45) Date of Patent: Jul. 18, 2023

(54) BRAZING APPARATUS AND METHOD FOR ANODE TARGET PLATE

(71) Applicant: Siemens Healthcare GmbH, Erlangen (DE)

(72) Inventors: Xi Peng Nie, Wuxi (CN); Can Bin Liu, Wuxi (CN)

(73) Assignee: Siemens Healthcare GmbH, Erlangen (DE)

( * ) Notice: Subject to any disclaimer, the term of this patent is extended or adjusted under 35 U.S.C. 154(b) by 0 days.

(21) Appl. No.: 17/509,442

(22) Filed: Oct. 25, 2021

(65) Prior Publication Data
US 2022/0126385 A1    Apr. 28, 2022

(30) Foreign Application Priority Data

Oct. 27, 2020  (CN) .......................... 202011162502.6

(51) Int. Cl.
*B23K 1/00* (2006.01)
*B23K 3/00* (2006.01)
(Continued)

(52) U.S. Cl.
CPC ............ *B23K 1/002* (2013.01); *B23K 1/0008* (2013.01); *B23K 3/0475* (2013.01); *B23K 3/08* (2013.01); *B23K 2101/36* (2018.08)

(58) Field of Classification Search
CPC .... B23K 1/002; B23K 1/0008; B23K 3/0475; B23K 3/08; B23K 2101/36; B23K 1/0056;
(Continued)

(56) References Cited

U.S. PATENT DOCUMENTS 2,803,732 A * 8/1957 Wade ........................ H01J 5/20
                                                                219/652
3,420,978 A * 1/1969 Weiss ..................... C23C 14/16
                                                            219/121.28
(Continued)

FOREIGN PATENT DOCUMENTS

CN         102240836 A        11/2011
CN         105965119 A         9/2016
(Continued)

OTHER PUBLICATIONS

Chinese Action dated Oct. 9, 2021, Application No. 2020111625026.

*Primary Examiner* — Kiley S Stoner
(74) *Attorney, Agent, or Firm* — Banner & Witcoff Ltd.

(57) ABSTRACT

A brazing apparatus and method for brazing an anode target plate of an X-ray generator are disclosed. The brazing apparatus comprises: a vacuum part for providing, during brazing, a vacuum environment at least for a target plate main body formed of an alloy, a brazing material, and a substrate; an induction brazing part for applying an induction current to the target plate main body, the brazing material and the substrate in the vacuum part so as to achieve heating to a temperature higher than the melting point of the brazing material, causing the substrate to be welded to the target plate main body through melting of the brazing material and a resulting reaction; and a directional energy welding part for applying a generated directional energy beam to a position of lower temperature determined on the target plate main body to perform heating.

20 Claims, 4 Drawing Sheets

(51) Int. Cl.
*B23K 1/002* (2006.01)
*B23K 3/047* (2006.01)
*B23K 3/08* (2006.01)
*B23K 101/36* (2006.01)

(58) Field of Classification Search
CPC .. B23K 1/0016; B23K 1/00; B23K 15/00–10; B23K 26/00–707; B23K 13/00–08
USPC .......... 228/175–177; 219/600–617, 219/121.12–121.35, 121.6–121.66
See application file for complete search history.

(56) References Cited

U.S. PATENT DOCUMENTS

| | | | | |
|---|---|---|---|---|
| 5,687,472 | A * | 11/1997 | Honma | H01H 33/66 228/180.1 |
| 6,333,484 | B1 * | 12/2001 | Foster | B23K 35/0244 219/76.1 |
| 2008/0105659 | A1 * | 5/2008 | Arnett | B23K 15/0006 219/121.14 |
| 2010/0032413 | A1 * | 2/2010 | Brenner | B23K 20/1275 219/76.1 |
| 2011/0264398 | A1 * | 10/2011 | Niewczas | G01L 19/0092 156/273.9 |
| 2017/0266745 | A1 * | 9/2017 | Richter | B23K 1/18 |
| 2019/0283170 | A1 * | 9/2019 | Kuntz | B29C 66/00145 |

FOREIGN PATENT DOCUMENTS

| | | | |
|---|---|---|---|
| CN | 106903390 A | 6/2017 | |
| CN | 108161156 A | 6/2018 | |
| CN | 108188521 A | 6/2018 | |
| CN | 111668079 A | 9/2020 | |
| FR | 2748960 A1 * | 11/1997 | ............ B23K 15/04 |
| GB | 1320332 A * | 6/1973 | ......... B23K 15/0033 |
| WO | 2008145513 A2 | 12/2008 | |

* cited by examiner

BRAZING APPARATUS AND METHOD FOR ANODE TARGET PLATE

CROSS-REFERENCE TO RELATED APPLICATIONS

The present application claims the benefit of the filing date of China patent application no. CN 202011162502.6, filed on Oct. 27, 2020, the contents of which are incorporated herein by reference in their entirety.

TECHNICAL FIELD

The disclosure relates to the technical field of medical equipment and, in particular, to a technology for processing an anode or an anode target plate.

BACKGROUND

An X-ray generator is a type of vacuum tube that converts a power supply input to X-rays. Controllable sources of usable X-rays enabled the birth of a new radiography technique, i.e. the imaging of partially-opaque objects by penetrating rays. Unlike other ion radiation sources, X-rays are produced only when the X-ray generator is energized. X-ray generators are widely used in computed tomography (CT) equipment, X-ray diffraction equipment, X-ray medical imaging equipment, and the field of industrial flaw detection. The ever-growing demands of high-performance CT scanning equipment and angiography systems is driving the development of high-performance medical X-ray generators.

The vacuum tube used in an X-ray generator comprises a cathode filament for emitting electrons to a vacuum, and an anode for receiving the emitted electrons and generating X-rays. Thus, an electron stream called a beam is formed in the X-ray generator. A power supply providing a high voltage called the tube voltage is connected between the anode and the cathode filament, so as to accelerate the electrons. The tube voltage, or the voltage applied between the cathode and anode of the X-ray generator, is generally between 30 and 200 kilovolts.

The anode target plate is an important component of the X-ray generator, which needs to sustain bombardment by electrons from the X-ray generator cathode end to produce X-rays when the X-ray generator is operating. In general, the anode target plate has a base of molybdenum alloy, and a trajectory region that receives X-ray bombardment can be covered with a tungsten-rhenium layer to increase durability. However, when the power of the X-ray generator is increased due to the low heat capacity and high density of a target plate of pure metal, the anode target plate will struggle to maintain a given level of product performance at extremely high temperatures.

SUMMARY

In view of the above, in one aspect the present disclosure proposes an efficient brazing apparatus for brazing an anode target plate using graphite, for example, as a substrate and by means of brazing, a target plate main body is heated rapidly such that the graphite is welded to a preset position on the anode target plate formed of a molybdenum alloy, i.e. a trajectory region on the anode target plate that is configured to receive bombardment by X-rays emitted by a cathode. The brazing apparatus comprises: a vacuum part for providing, during brazing, a vacuum environment at least for a target plate main body formed of an alloy, a brazing material, and a substrate to be brazed to a surface of the target plate main body; an induction brazing part for applying an induction current to the target plate main body, the brazing material, and the substrate in the vacuum part so as to at least heat the brazing material to a temperature higher than a melting point, causing the substrate to be welded to the target plate main body through melting of the brazing material and a resulting reaction; and a directional energy welding part for applying a generated directional energy beam to a position of lower temperature determined on the target plate main body to perform heating.

Optionally, the brazing apparatus further comprises: a sensor configured to measure temperature information of the target plate main body during the brazing; and a controller configured to receive the temperature information fed back by the sensor, to determine a position of lower temperature on the target plate main body, and to control the directional energy welding part to apply the generated directional energy beam to said position.

Optionally, the induction brazing part of the brazing apparatus comprises an induction heater, by means of which induction heater a medium-frequency induction current is generated for heating the target plate main body, the brazing material, and the substrate in the vacuum part.

Optionally, the directional energy welding part of the brazing apparatus comprises an electron beam welder or a laser welder.

Optionally, the brazing apparatus further comprises: a stacking part disposed in the vacuum part such that multiple said target plate main bodies are stacked by means of the stacking part, and the target plate main body located at the uppermost level of the stacking part undergoes brazing with the brazing material and the substrate.

Optionally, the vacuum part of the brazing apparatus comprises: a first vacuum chamber for providing a vacuum environment for the brazing; and a second vacuum chamber for providing a vacuum cooling environment for the target plate main body that has undergone the brazing, wherein a valve that can be opened or closed is arranged between the first vacuum chamber and the second vacuum chamber; when the valve is opened, the first vacuum chamber and the second vacuum chamber are in communication with each other so that the target plate main body located in the first vacuum chamber is transferred to the second vacuum chamber to cool.

Optionally, the first vacuum chamber of the brazing apparatus comprises a sealed quartz bell jar to observe, through the quartz bell jar, the state presented by the brazing material on the target plate main body during the brazing.

Optionally, the brazing apparatus further comprises: a first cooling apparatus configured to cool the exterior of the first vacuum chamber so as to prevent the temperature of an outside surface of the first vacuum chamber from becoming too hot; and a second cooling apparatus configured to cool the second vacuum chamber so as to increase the speed of cooling of the target plate main body that has undergone the brazing.

Another aspect of the present disclosure further provides a brazing method. The brazing method comprises: placing in a vacuum environment a target plate main body formed of an alloy, a brazing material, and a substrate; arranging the brazing material and substrate at a preset position on the target plate main body, and applying an induction current to the target plate main body, brazing material, and substrate so as to achieve heating to a temperature higher than the melting point of the brazing material, causing the substrate to be welded to the target plate main body through melting of the brazing material and a resulting reaction; applying a directional energy beam to a position of lower temperature determined on the target plate main body to perform heating.

Optionally, the method comprises observing temperature information of the target plate main body to determine the position of lower temperature, and adjusting the direction of the directional energy beam so that it is applied to said position on the target plate main body.

Optionally, in the brazing method, the target plate main body comprises a molybdenum alloy, and the substrate comprises graphite.

Optionally, in the brazing method, the degree of vacuum of the vacuum environment provided by the vacuum part for brazing is at most 5×10−5 mbar.

Optionally, in the brazing method, the brazing material is an alloy brazing material.

The brazing apparatus and method provided in the present disclosure have the following advantage: the induction brazing part is used to heat the target plate main body, brazing material, and welding substrate in the vacuum environment to a temperature higher than the melting point of the brazing material by generating a medium-frequency induction current, and at the same time a welding method based on a directional energy beam is used to remedy the problem of the medium-frequency induction current being smaller at a middle/central position on the target plate main body, such that the target plate main body is heated more uniformly and has a faster rate of temperature increase during brazing of the target plate main body, brazing material, and welding substrate, thus improving the efficiency and quality of brazing.

Another advantage of the present disclosure is that the first vacuum chamber for brazing and the second vacuum chamber for cooling are provided in the brazing apparatus, so that the target plate main body undergoing brazing is transferred to the second vacuum chamber for further cooling, thus improving the efficiency and quality of the anode target plate during brazing. Thus, more effective and high-quality welding of the substrate (comprising graphite) to the target plate (formed of a molybdenum alloy for example) is achieved, to provide the service life and performance of the anode target plate.

BRIEF DESCRIPTION OF THE DRAWINGS/FIGURES

Embodiments of the present disclosure are described in detail below with reference to the accompanying drawings, to give those skilled in the art a clearer understanding of the abovementioned and other features and advantages of the present disclosure. In the drawings.

Figure 1:
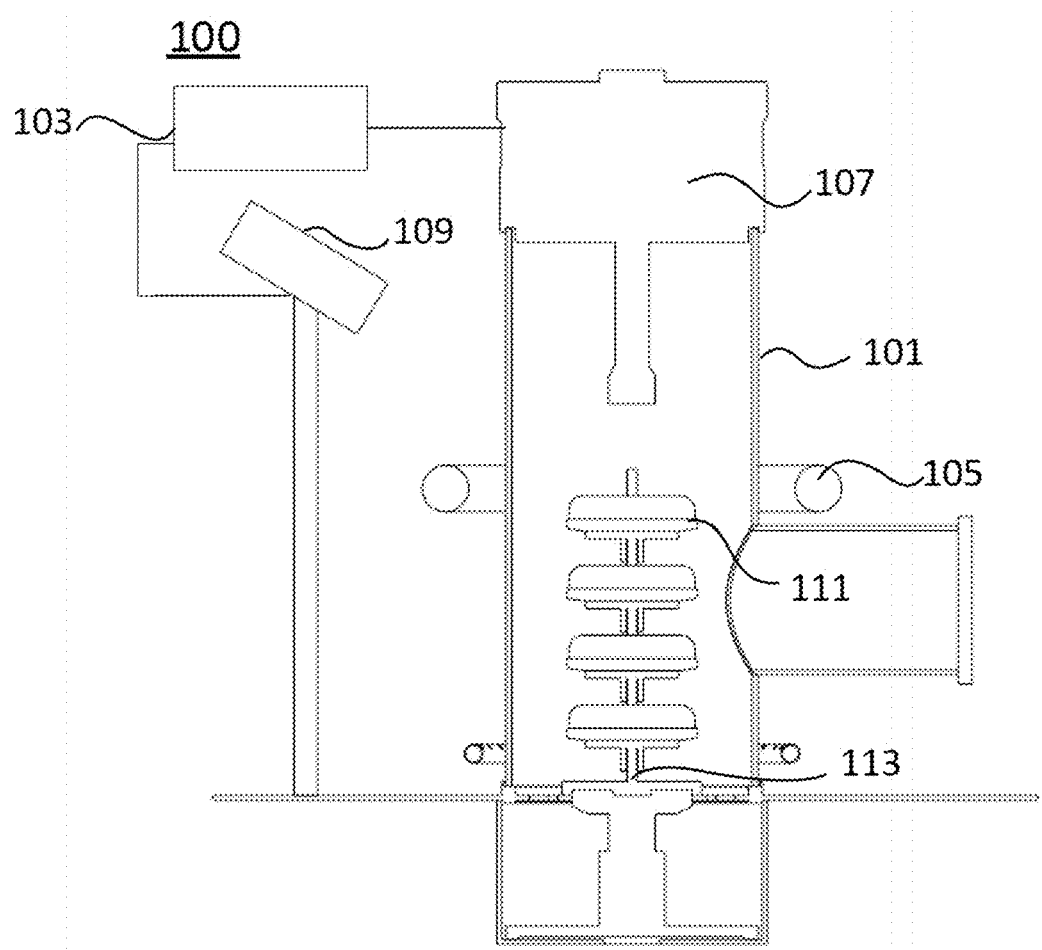
FIG. 1 shows an example brazing apparatus 100 based on medium-frequency induction welding and electron beam welding according to an exemplary embodiment.

KEY TO THE DRAWINGS brazing apparatus 100, 200
brazing vacuum chamber 101, 201
quartz bell jar 2011
controller 103, 203
cooling vacuum chamber 204
induction heater 105, 205
electron beam welder 107, 207
sensor 109, 209
target plate main body/anode target plate 111, 211
stacking part 113, 213
vacuum pump 215
mechanical arm 217
valve 219
cooling circulation apparatus 221.

DETAILED DESCRIPTION

To enable a clearer understanding of the technical features, objectives, and effects of the disclosure, particular embodiments of the present disclosure are now explained with reference to the accompanying drawings, in which identical labels indicate identical parts.

As used herein, "schematic" means "serving as an instance, example or illustration". No drawing or embodiment described herein as "schematic" should be interpreted as a more preferred or more advantageous technical solution.

To make the drawings appear uncluttered, only those parts relevant to the present disclosure are shown schematically in the drawings. The drawings do not necessarily represent the actual structure thereof as a product. Furthermore, to make the drawings appear uncluttered for ease of understanding, in the case of components having the same structure or function in certain drawings, only one of these is drawn schematically, or only one is marked.

In this text, "a" is not limited to only mean "just this one"; it may also mean "more than one". As used herein, "first" and "second" etc. are merely used to differentiate between parts, not to indicate their order or degree of importance, or any precondition of mutual existence, etc.

When the power of an X-ray generator is increased due to the low heat capacity and high density of an anode target plate of pure metal, the anode target plate will be unable to satisfy durability and product performance requirements in high-temperature conditions. Certain materials, however, can meet the requirement for high heat capacity and low density. For example, graphite has a high heat capacity of 710 J/(kg.K) and an extremely low density of about 1.8-2.0 g/cm−3. Thus, a molybdenum alloy and high-heat-capacity graphite can be brazed together to increase the heat capacity and heat dissipation ability of the anode target plate. In the operating environment of some X-ray generators, the maximum temperature of the anode target plate might reach 1500 degrees Celsius, and the anode target plate runs at a rotation speed as high as 10000 rpm. It is even necessary to take into account high-speed turning of a tomography scanner gantry. Thus, there is a need to provide a brazing technique that is capable of ensuring that the anode target plate is of high strength and also capable of maintaining thermal stability under said high temperature conditions so that the material brazed to the anode target plate will not separate or fall off.

Brazing of graphite composite anode target plates in existing X-ray generators is generally performed in high-vacuum and high-temperature brazing furnaces. For example, the various components of anode target plate brazing, e.g. a brazing material, graphite, and an anode target plate made of a molybdenum alloy, are placed on specific brazing tooling, and the alloy brazing material is caused to react with the molybdenum alloy and graphite in a high-vacuum and high-temperature brazing furnace so as to bond the graphite to the molybdenum alloy such that the graphite is brazed at a specific position on the anode target plate. At present, brazing furnaces based on high vacuum and high temperature have various drawbacks. Because the design temperature thereof is high, and a material of an internal hot zone requires a large amount of metal of tungsten/molybdenum material, a rigorous sealing apparatus is needed. Vacuum equipment is also subject to exacting requirements, and because the internal structure of the chamber body is complex and the volume is large, the vacuum equipment needs a high air extraction speed and power requirements. Moreover, a lot of time is consumed, i.e. due to the effects of the large volume of the furnace body and the high-vacuum environment, heating and cooling in the course of brazing are generally slow. Finally, the vacuum sealing structure of the brazing furnace makes it difficult to observe the process and result of brazing.

The present disclosure provides a brazing apparatus for an anode target plate of an X-ray generator that addresses these aforementioned issues. By providing medium-frequency induction welding to heat a target plate main body, a brazing material, and a substrate used for welding to a certain temperature, and providing a directional energy welding apparatus of an electron beam welding part for example to heat positions on the anode target plate where the rate of temperature increase is slow or the induction current is small such as the middle/center position, for example, the target plate main body is enabled to heat up more quickly and be more uniform in temperature during brazing, so as to improve the efficiency and quality of brazing, and improve the quality of the anode target plate.

FIG. 1 shows an example brazing apparatus 100 based on medium-frequency induction welding and electron beam welding according to an exemplary embodiment.

As shown in FIG. 1, the brazing apparatus 100 in this exemplary embodiment comprises: a vacuum part for providing, during brazing, a vacuum environment at least for a target plate main body 111, a brazing material, and a substrate to be brazed to a surface of the target plate main body 111; an induction brazing part for applying an induction current to the target plate main body 111, the brazing material, and the substrate in the vacuum part so as to heat the brazing material to a temperature higher than a melting point, causing the substrate to be welded to the target plate main body 111 through melting of the brazing material and a resulting reaction; and a directional energy welding part for applying a generated directional energy beam to a position of lower temperature determined on the target plate main body 111 to perform heating. Here, the target plate main body 111 may be made of a molybdenum alloy, the brazing material may be an alloy brazing material, and a trajectory region receiving bombardment by X-rays emitted from a cathode may be preset (e.g. predetermined) on the target plate main body 111. The trajectory region may be brazed to graphite, which has a high heat capacity and extremely low density and can increase the heat capacity and heat dissipation ability of the anode target plate so as to increase the heat capacity and heat dissipation energy of the anode target plate while ensuring that the anode target plate has properties such as high strength. Here, air in the vacuum part can be extracted by means of a vacuum pump so as to achieve a vacuum environment in which the degree of vacuum is at least 5×10−5 mbar. The vacuum part, for example, comprises a brazing vacuum chamber 101.

In the brazing apparatus 100 according to some embodiments, the induction brazing part comprises an induction heater 105, by means of which induction heater 105 a medium-frequency induction current is generated for heating the target plate main body 111, the brazing material, and the substrate (e.g. graphite) in the vacuum part, e.g. a medium-frequency induction current induced in the molybdenum alloy target plate main body 111, the brazing material and the graphite by the induction heater 105, which current can heat the brazing material to the melting point temperature thereof, such that the brazing material melts and reacts with the molybdenum alloy and graphite to bond the molybdenum alloy to the graphite by welding. The induction heater 105 may be arranged at a position at the same height as the target plate main body 111 such that the brazed target plate main body 111 is located in a region enclosed by the induction heater 105 so as to produce a local medium-frequency induction current for the target plate main body 111, the brazing material, and the substrate used for welding which are located within said region so as to produce the heat required for brazing. However, due to the fact that some target plate main bodies 111 are restricted by their geometric shape, e.g. disk shape, the induction current is weaker in a central region of the target plate main body 111 and, as a result, the temperature in this central region is lower than in a peripheral or edge region.

For this reason, a directional energy welding part, for example an electron beam welder 107, is also provided in the brazing apparatus 100 of this embodiment, to target the central region of the target plate main body 111 so as to heat a middle or central position of the target plate main body. Here, under the action of heating by the induction heater 105 and heating by the electron beam welder 107, the workpiece surface temperature of the target plate main body can uniformly increased to the temperature set for brazing so that the brazing material, for example alloy brazing material, melts and undergoes a reaction, thus welding the graphite to the molybdenum alloy. It must be explained that the induction heater 105 can cause a medium-frequency/high-frequency induction current to arise in the target plate main body 111 so as to heat the target plate main body 111 and the brazing material to a temperature higher than the melting point, and the reaction caused by melting of the brazing material welds the substrate (e.g. graphite) to the target plate main body 111. The induction heater 105 may comprise a hollow copper tube with an annular surface such that the target plate main body 111 can be positioned in the region enclosed by the induction heater 105. An alternating magnetic field is produced by inputting medium-frequency or high-frequency AC electricity, e.g. AC electricity at a frequency of 300 kHz-3000 kHz or more, to the copper tube with the annular surface, and an induction current with the same frequency is produced in the workpiece (e.g. the target plate main body 111). Under the action of the eddy current induction effect and the skin induction effect, the surface workpiece is rapidly heated so as to melt the brazing material disposed at the surface of the target plate main body 111, for example.

In the brazing apparatus 100 according to some embodiments, the directional energy welding part comprises an electron beam welder 107 or a laser welder. The electron beam welder 107 is also called an electron beam gun, being an apparatus used to produce, accelerate, and converge an electron beam current of high energy density so as to emit an electron beam having a certain energy, beam current, speed, and angle in order to heat the irradiated object until the brazing material melts and reacts to weld the welding substrate (e.g. graphite) to the target plate main body 111.

However, not all anode target plates 111 have a centrally-symmetric target plate shape, or some anode target plates are not completely homogeneous, so it is necessary to determine, by certain technical methods, a part of the target plate main body which is at a lower temperature (e.g. less than a predetermined and/or threshold temperature) during brazing, and on this basis control the heating of this lower-temperature part by the electron beam welder 107, for example. For this purpose, the brazing apparatus 100 according to some embodiments further comprises: a sensor 109 configured to measure the temperature of the target plate main body 111 during brazing, and a controller 103 configured to receive temperature information fed back by the sensor 109, to determine a lower-temperature position on the target plate main body 111, and to control the directional energy welding part, e.g. the electron beam welder 107 to apply the generated directional energy beam to said lower-temperature position so as to heat the target plate main body 111 at this position, thus increasing the rate of temperature increase of the target plate main body 111 overall and improving the efficiency of brazing. Here, the sensor 109 may be a temperature sensor that measures temperature on the basis of infrared rays, for example, so as to sense the temperature distribution of the target plate main body 111. In addition, the sensor 109 used for temperature measurement is further used for monitoring the temperature of the target plate main body 111 so as to ensure that the workpiece surface temperature of the target plate main body 111 rises uniformly to the temperature set for brazing, e.g. the temperature at which the brazing material melts. Based on the temperature of the target plate main body 111 as monitored by the sensor 109, the controller 103 may control the size, frequency, and output time, etc. of the induction current of the induction heater 105 and/or the energy density and output time, etc. of the electron beam current of the electron beam welder 107.

According to some embodiments, to improve the anode target plate brazing process or efficiency, the brazing apparatus further comprises: a stacking part 113 disposed in the vacuum part such that multiple target plate main bodies 111 are stacked by means of the stacking part 113, and the target plate main body 111 located at the uppermost level of the stacking part 113 undergoes brazing with the brazing material and the substrate. Here, the stacking part 113 serves as supporting tooling for grouping the target plate main bodies 111 undergoing brazing in an orderly stack so as to ensure that the target plate main body 111 at the uppermost level is at the optimal position for brazing, e.g. at the same height as the induction heater 105 such that the target plate main body 111 is located in the region enclosed by the induction heater 105. In addition, within the sealed vacuum part, for example the brazing vacuum chamber 101, a material raising/lowering platform can also be arranged at the bottom of the stacking part 113 to further support the ordered stack of the target plate main bodies 111 and raise the next target plate main body 111 requiring brazing to the brazing position, e.g. a position located in a horizontal direction with respect to the induction heater 105.

As well as taking into account the problem of temperature increase during brazing of the anode target plate, it is also necessary to take into account the problem of cooling during brazing and the problem of cooling the anode target plate when brazing is complete.

Figure 2:
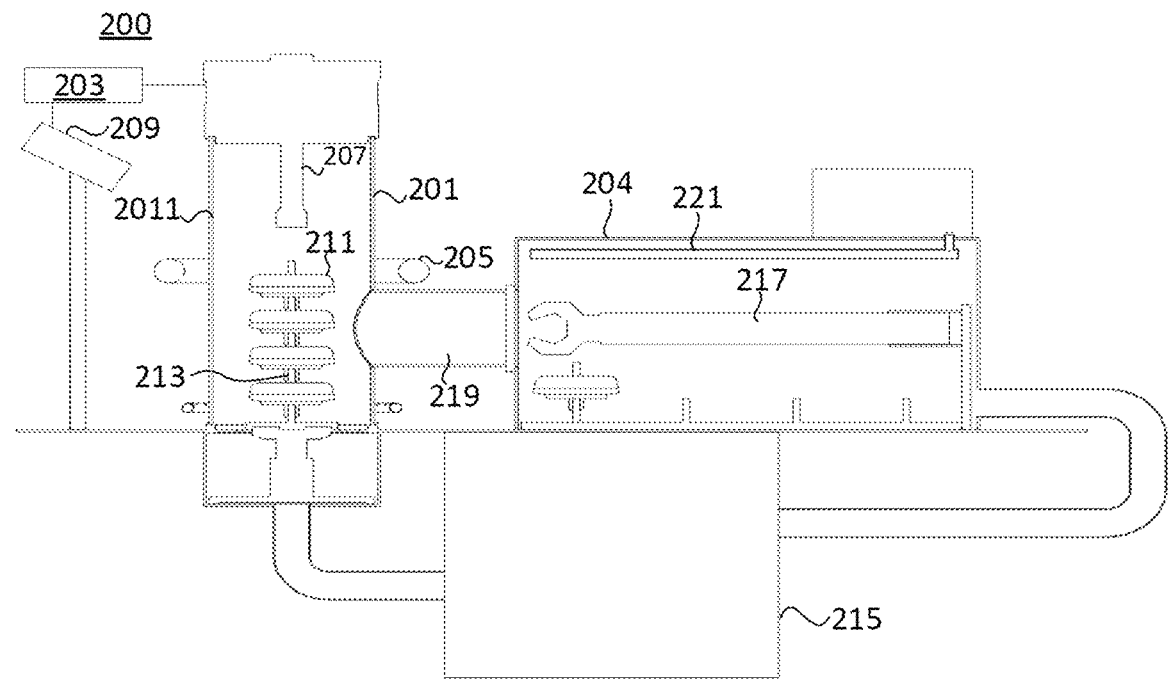
FIG. 2 shows an example brazing apparatus 200 based on electron beam welding and medium-frequency induction welding, in which a cooling vacuum chamber is provided, according to another exemplary embodiment.

FIG. 2 shows an example brazing apparatus 200 based on electron beam welding and medium-frequency induction welding, in which a cooling vacuum chamber is provided, according to another exemplary embodiment.

According some other embodiments, as shown in FIG. 2, a vacuum part of the brazing apparatus 200 comprises: a first vacuum chamber, for example a brazing vacuum chamber 201 for providing a vacuum environment for brazing, and a second vacuum chamber, for example a cooling vacuum chamber 204 for providing a vacuum cooling environment for a target plate main body 211 that has undergone brazing. An induction heater 205 and an electron beam welder 207 are used to heat the target plate main body 211 and brazing material to a temperature at which a brazing reaction takes place in the first vacuum chamber (i.e. the brazing vacuum chamber 201). A valve 219 that can be opened or closed is arranged between the first vacuum chamber and the second vacuum chamber (i.e. the cooling vacuum chamber 204). When the valve 219, e.g. sealing valve is opened, communication is established between the first vacuum chamber and the second vacuum chamber so that the target plate main body 211 located in the first vacuum chamber is transferred to the second vacuum chamber to cool. The second vacuum chamber can be kept at the same degree of vacuum as the first vacuum chamber.

Since the anode target plate 211 (i.e. target plate main body 211) that has undergone brazing in the brazing vacuum chamber 201 is still in a high-temperature state, the anode target plate 211 needs to be moved out of the brazing vacuum chamber 201 to cool. For this purpose, the brazing apparatus 200 further provides a mechanical arm 217 with extension/retraction, which first detaches the brazed anode target plate 211 (i.e. target plate main body 211) in the brazing vacuum chamber 201 from the stacking part 213, and then transfers the anode target plate to the cooling vacuum chamber 204 through an opened sealing valve, and in addition can transfer supporting tooling to the cooling vacuum chamber 204 at the same time. In addition, air in the brazing vacuum chamber 201 and/or cooling vacuum chamber 204 can be extracted by means of a vacuum pump 215 so as to achieve a vacuum environment in which the degree of vacuum is at least $5 \times 10^{-5}$ mbar. In addition, the brazing apparatus 200 may further comprise: a controller 203 which, based on the temperature of the target plate main body 211 as monitored by a sensor 209, may control the size, frequency, and output time, etc. of the induction current of the induction heater 205, and/or the energy density and output time, etc. of the electron beam current of the electron beam welder 207.

In the brazing apparatus 100 according to some embodiments, the first vacuum chamber comprises a sealed quartz bell jar 2011, through which the state presented by the brazing material on the target plate main body 211 during the brazing may be observed, e.g. observe the flow of the alloy brazing material after melting, so as to observe in real time the technical process of brazing.

According to some embodiments, the brazing apparatus 200 further comprises: a first cooling apparatus configured to cool the exterior of the first vacuum chamber, e.g. the brazing vacuum chamber 201 so as to prevent the temperature of an outside surface of the first vacuum chamber from becoming too hot (e.g. from exceeding a predetermined and/or threshold maximum temperature); and a second cooling apparatus configured to cool the second vacuum chamber, e.g. the cooling vacuum chamber 204 so as to increase the speed of cooling of the target plate main body 211 that has undergone brazing. The first cooling apparatus may, for example, be arranged at a lower end of the outside of the quartz bell jar 2011, for the purpose of ensuring that the quartz bell jar 2011 will not become too hot during consecutive brazing of multiple anode target plates 211. The second cooling apparatus, e.g. a cooling circulation apparatus 221 may be positioned at the sealed cooling vacuum chamber 204. Thus, in the brazing vacuum chamber 201, it is possible to continue brazing the next batch of anode target plates 211 (i.e. target plate main bodies 211), thus enabling continuous production and increasing the overall brazing production efficiency.

According to another aspect of the present disclosure, a brazing method is further provided.

Figure 3:
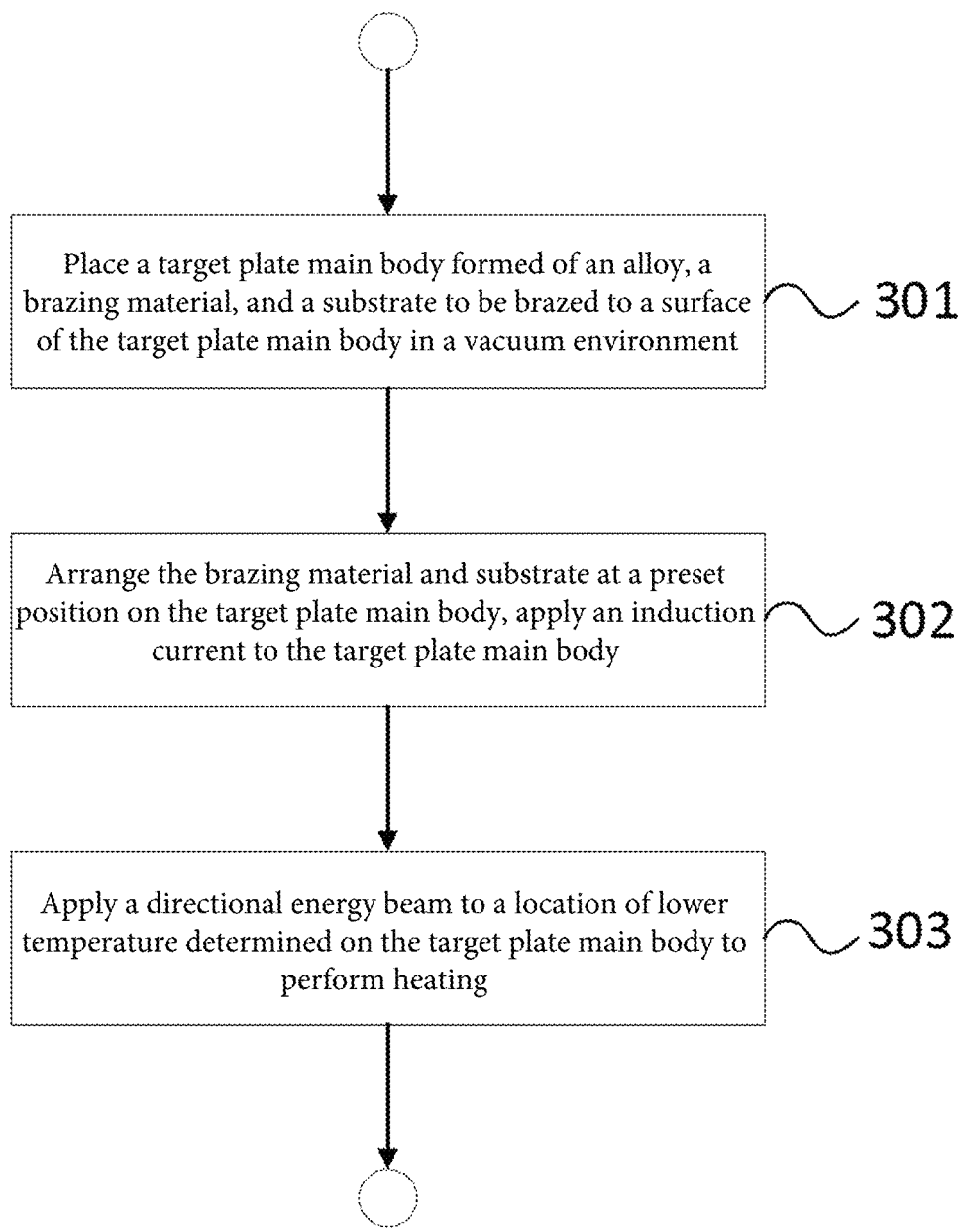
FIG. 3 is an example schematic flow chart showing a brazing method based on medium-frequency induction welding and electron beam welding according to an exemplary embodiment.

FIG. 3 shows an example method for brazing an anode target plate of an X-ray generator according to an exemplary embodiment.

As shown in FIG. 3, the brazing method according to an embodiment of the present disclosure comprises the following steps:

S301: a target plate main body formed of an alloy, a brazing material, and a substrate to be brazed to a surface of the target plate main body, are placed in a vacuum environment.

Here, the vacuum environment may mean that a vacuum pump has extracted air from a closed or sealed vacuum chamber.

S302: the brazing material and substrate are arranged at a preset position on the target plate main body, and an induction current is applied to the target plate main body, brazing material, and substrate so as to achieve heating to a temperature higher than the melting point of the brazing material, causing the substrate to be welded to the target plate main body through melting of the brazing material and a resulting reaction. Here, the induction brazing part may comprise an induction heater, so as to generate a medium-frequency induction current and apply the medium-frequency induction current to the target plate main body, the brazing material, and the substrate, to achieve heating at least to a temperature higher than the melting point of the brazing material.

S303: a directional energy beam is applied to a position of lower temperature determined on the target plate main body to perform heating.

For example, in the case of a target plate main body with a regular disk shape, the position of lower temperature or position of smaller medium-frequency induction current thereof can be determined as being approximately located in the middle of the target plate main body, and it is only necessary to apply the directional energy beam to this middle position to perform heating, by means of an electron beam welder for example.

According to some embodiments, in the brazing method, the target plate main body comprises a molybdenum alloy, and the substrate comprises graphite.

According to some embodiments, in the brazing method the degree of vacuum of the vacuum environment provided by the vacuum part for brazing is at most 5×10−5 mbar.

According to some embodiments, in the brazing method the brazing material is an alloy brazing material.

Figure 4:
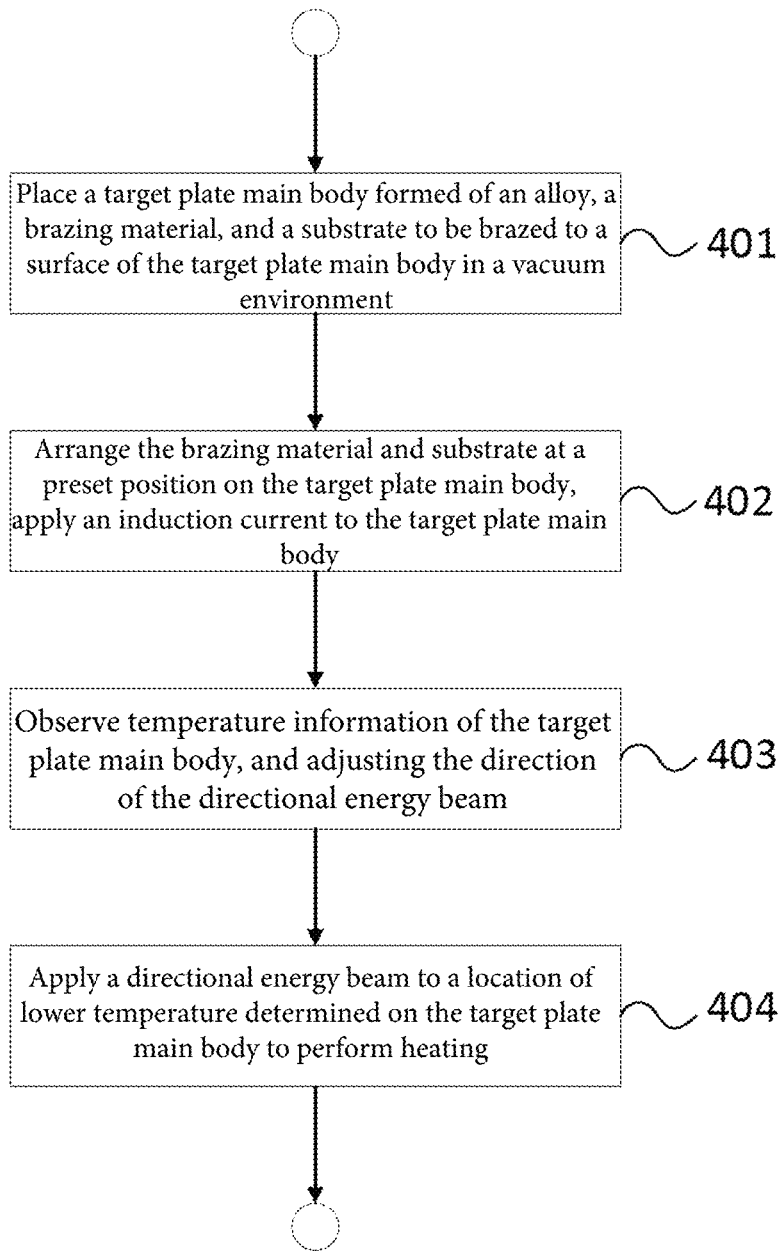
FIG. 4 is an example schematic flow chart showing a brazing method based on medium-frequency induction welding and electron beam welding according to another exemplary embodiment.

FIG. 4 is an example schematic flow chart showing a brazing method based on medium-frequency induction welding and electron beam welding according to another exemplary embodiment.

As shown in FIG. 4, the brazing method according to another exemplary embodiment comprises the following step:

S403: observing temperature information of the target plate main body to determine a position of lower temperature, and adjusting the direction of the directional energy beam so that it is applied to said position on the target plate main body.

For example, a temperature sensor based on infrared temperature measurement may be used to measure temperature information, e.g. temperature distribution information of the target plate main body, to determine a lower-temperature part, or a part where the medium-frequency induction current is conjectured to be weaker, on the target plate main body during brazing, to use the directional energy beam, e.g. laser beam welding or electron beam welder, etc. to heat and raise the temperature of the abovementioned part and position.

Steps S401-S402 are the same as steps S301-S302, and step S404 is the same as step S303, so these are not described again here.

It should be understood that although the description herein is based on various embodiments, it is by no means the case that each embodiment contains just one independent technical solution. Such a method of presentation is adopted herein for clarity. Those skilled in the art should consider the description in its entirety. The technical solutions in the various embodiments could also be suitably combined to form other embodiments capable of being understood by those skilled in the art.

The above are example embodiments of the present disclosure, which are presented in a non-limiting sense. Any amendments, equivalent substitutions, or improvements etc. made within the spirit and principles of the present disclosure are to be considered as part of the scope of protection thereof.

What is claimed is:

1. A brazing apparatus for brazing an anode target plate of an X-ray generator, comprising:
 a vacuum part configured to provide, during brazing, a vacuum environment for (i) a target plate main body that is formed of an alloy, (ii) a brazing material, and (iii) a substrate to be brazed to a surface of the target plate main body;
 an induction brazing part configured to apply an induction current to the target plate main body, the brazing material, and the substrate within the vacuum part to heat the brazing material to a temperature that is higher than a melting point of the brazing material to cause the substrate to be brazed to the surface of the target plate main body via a melting of the brazing material and a resulting reaction;
 a directional energy welding part configured to perform heating by applying a directional energy beam to a location on the target plate main body having a temperature that is less than a predetermined temperature threshold;
 a sensor configured to measure a temperature of the target plate main body during brazing; and
 a controller configured to determine, based upon the measured temperature, the location on the target plate main body having the temperature less than the predetermined temperature threshold, and to control the directional energy welding part to cause the directional energy welding part to apply the generated directional energy beam to the location.

2. The brazing apparatus as claimed in claim 1, wherein the induction brazing part comprises an induction heater configured to generate an induction current within a predetermined frequency range to heat the target plate main body, the brazing material, and the substrate within the vacuum part.

3. The brazing apparatus as claimed in claim 1, wherein the directional energy welding part comprises an electron beam welder.

4. The brazing apparatus as claimed in claim 1, wherein the directional energy welding part comprises a laser welder.

5. The brazing apparatus as claimed in claim 1,
wherein the target plate main body is from among a plurality of target plate main bodies, and further comprising:
a stacking part disposed in the vacuum part and configured to stack the plurality of target plate main bodies, the target plate main body being located at an uppermost level of the stacking part including the plurality of target plate main bodies.

6. The brazing apparatus as claimed in claim 1, wherein the vacuum part comprises:
a first vacuum chamber configured to provide the vacuum environment for the brazing;
a second vacuum chamber configured to provide a vacuum cooling environment for the target plate main body that has undergone the brazing; and
a valve configured to be selectively opened or closed, the valve being arranged between the first vacuum chamber and the second vacuum chamber,
wherein, when the valve is opened, the first vacuum chamber and the second vacuum chamber are coupled to one another such that the target plate main body is transferred from the first vacuum chamber to the second vacuum chamber.

7. The brazing apparatus as claimed in claim 6, wherein the first vacuum chamber comprises:
a sealed quartz bell jar configured to enable observation of the brazing material on the target plate main body during the brazing.

8. The brazing apparatus as claimed in claim 6, further comprising:
a first cooling apparatus configured to cool an exterior of the first vacuum chamber to prevent an outside surface temperature of the first vacuum chamber from exceeding a further predetermined threshold temperature; and
a second cooling apparatus configured to cool the second vacuum chamber to increase a rate of cooling of the target plate main body that has undergone the brazing.

9. The brazing apparatus as claimed in claim 1, wherein the target plate main body comprises a molybdenum alloy, and
wherein the substrate is comprised of graphite.

10. The brazing apparatus as claimed in claim 1, wherein the degree of vacuum of the vacuum environment is at most $5 \times 10^{-5}$ mbar.

11. The brazing apparatus as claimed in claim 1, wherein the brazing material comprises an alloy brazing material.

12. A brazing method, comprising:
placing, in a vacuum environment, (i) a target plate main body formed of an alloy, (ii) a brazing material, and (iii) a substrate to be brazed to a surface of the target plate main body;
arranging the brazing material and the substrate at a predetermined position on the target plate main body;
applying an induction current to the target plate main body, the brazing material, and the substrate to heat the brazing material to a temperature that is higher than a melting point of the brazing material to cause the substrate to be brazed to the surface of the target plate main body via melting of the brazing material and a resulting reaction; and
applying a directional energy beam to a location on the target plate main body having a temperature, which is less than a predetermined temperature threshold, to perform heating, by:
measuring a temperature of the target plate main body during brazing; and
adjusting the direction of the directional energy beam to apply the directional energy beam to the position on the target plate main body that is less than the predetermined temperature threshold.

13. The brazing method as claimed in claim 12, wherein the target plate main body comprises a molybdenum alloy, and
wherein the substrate is comprised of graphite.

14. The brazing method as claimed in claim 12, wherein the degree of vacuum of the vacuum environment for brazing is at most $5 \times 10^{-5}$ mbar.

15. The brazing method as claimed in claim 12, wherein the brazing material comprises an alloy brazing material.

16. The brazing method as claimed in claim 12, wherein the act of applying the induction current to the target plate main body comprises:
applying, via an induction heater, the induction current within a predetermined frequency range to heat the target plate main body, the brazing material, and the substrate within the vacuum environment.

17. The brazing method as claimed in claim 12, wherein the act of applying the directional energy beam comprises:
applying the directional energy beam using an electron beam welder or a laser welder.

18. The brazing method as claimed in claim 12, further comprising:
stacking a plurality of target plate main bodies via a stacking part, the target plate main body being located at an uppermost level of the stacking part including the plurality of target plate main bodies.

19. The brazing method as claimed in claim 12, further comprising:
providing the vacuum environment by providing a first vacuum chamber comprising a sealed quartz bell jar configured to enable observation of the brazing material on the target plate main body during the brazing;
providing a second vacuum chamber configured to provide a vacuum cooling environment for the target plate main body that has undergone the brazing; and
providing a valve configured to be selectively opened or closed, the valve being arranged between the first vacuum chamber and the second vacuum chamber,
wherein, when the valve is opened, the first vacuum chamber and the second vacuum chamber are coupled to one another such that the target plate main body is transferred from the first vacuum chamber to the second vacuum chamber.

20. The brazing method as claimed in claim 19, further comprising:
providing a first cooling apparatus configured to cool an exterior of the first vacuum chamber to prevent an outside surface temperature of the first vacuum chamber from exceeding a further predetermined threshold temperature; and
providing a second cooling apparatus configured to cool the second vacuum chamber to increase a rate of cooling of the target plate main body that has undergone the brazing.

* * * * *